Patented May 26, 1942

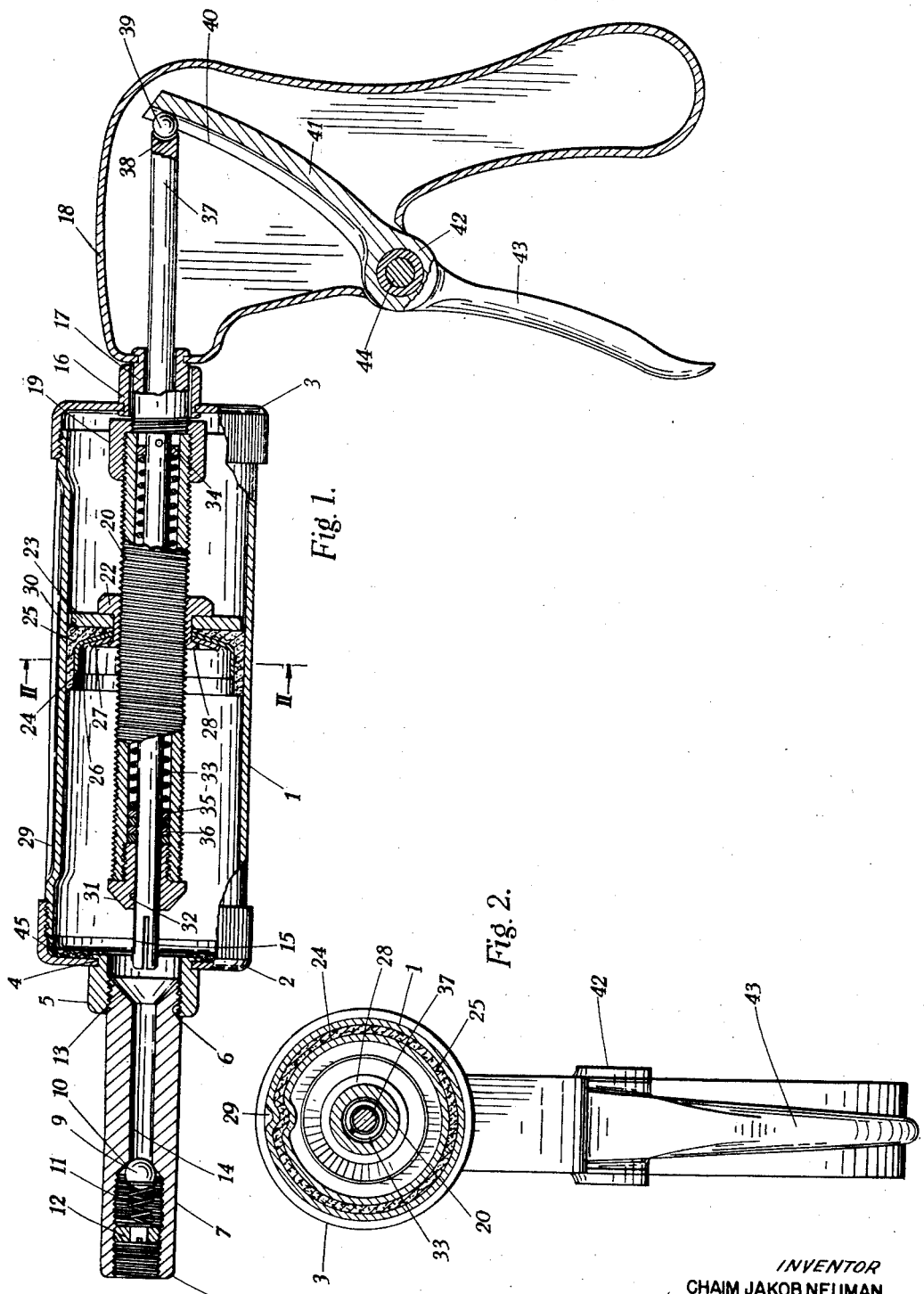

2,284,533

UNITED STATES PATENT OFFICE 2,284,533

GREASE GUN

Chaim Jakob Neuman, London, England

Application October 28, 1940, Serial No. 363,184
In Great Britain November 9, 1939

11 Claims. (Cl. 221—47.3)

This invention concerns improvements in or relating to grease guns and has for object to provide an improved appliance of this kind.

According to this invention there is provided a grease gun comprising a grease storing cylinder, a main plunger within said cylinder, means for traversing the main plunger along the said cylinder, a secondary cylinder in communication with the storing cylinder, a secondary plunger co-operating with this secondary cylinder to eject grease therefrom, and means for actuating the said secondary plunger independently of the main plunger.

In order that this inventoin may be thoroughly understood and readily carried into practice I have appended hereto a drawing of one embodiment of the invention and in which drawing—

Figure 1 is a part side elevation and part longitudinal sectional elevation of one form of grease gun constructed in accordance with this invention;

Figure 2 is a cross section on line 1—1, Figure 1.

The grease gun illustrated in the drawing and embodying this invention comprises a grease storing cylinder 1 provided at its ends with screw-on caps 2 and 3, respectively.

The cap 2 has a central aperture 4 in which is fixed a tubular nut 5 internally screw threaded to receive the screw threaded end 6 of an outlet pipe or tube 7 screwed into the nut 5 so as to be rigidly secured to the cap 2. The outer end 8 of the pipe 7 constitutes an outlet through which grease discharged from the grease gun is ejected and which is adapted to receive a nozzle to be engaged with a grease nipple upon an automobile or other machine which is to be greased by the gun.

Within the pipe 7 is arranged a non-return valve comprising a ball 9 seated upon a conical valve seat 10 by means of a spring 11 engaging at one end the ball 9 and bearing at the other end upon an adjustable screw threaded axially apertured plug 12 screwed into the internally threaded pipe 7.

The inner end of the pipe 7 is enlarged at 13 to frusto-conical form to facilitate the passage of grease from the cylinder 1 into the pipe 7, and the part of the bore of the pipe 7 lying between the outer end of the frusto-conical part 13 and the valve seat 10 forms a secondary cylinder 14 with which co-operates a secondary plunger 15 presently fully to be described.

The cap 3 is provided with a central tubular boss 16 in which is rotatably mounted a sleeve 17 fixed at its outer end in a hollow sheet metal pistol-type handle 18. The inner end of the sleeve 17 is provided externally with a right-hand screw thread engaging in a correspondingly screw threaded portion of a tubular junction piece 19, the inner part of which is provided internally with a left-hand screw thread into which is screwed a correspondingly externally screw threaded tubular or hollow guide rod 20. The junction piece 19 thus secures the guide rod 20 and the sleeve 17 rigidly together so that when the handle 18 is rotated about the axis of the sleeve 17 both the latter and the guide rod 20 simultaneously rotate. Axial movement of the guide rod 20 and the sleeve 17 is prevented by the abutment of the junction piece 19 and the handle 18, respectively, against the opposite ends of the tubular boss 16.

On the guide rod 20 is screwed a main plunger comprising a nut 22 internally threaded for co-operation with the external screw thread of the guide rod. This nut is provided at one end with a flange against which engages an apertured disc 23 mounted upon the nut and acting as a support for a leather or other suitable cup washer 24 fitting closely within the grease storing cylinder 1. The inwardly directed flange 25 of the cup washer is clamped against the disc 23 by apertured cup and disc members 26 and 27 secured on the body of the nut 21 by riveting the latter over at 28 as shown.

The grease storing cylinder is provided on its inside with a straight longitudinal rib or key 29 engaging in a cooperating groove or keyway 30 in the main plunger so that the main plunger is free to slide under the influence of the guide rod 20 along the grease storing cylinder but is unable to rotate in the latter.

It will thus be clear that, when the handle 18 is rotated about the axis of the sleeve 17 (and incidentally the axis of the grease storing cylinder 1), the main plunger will be caused to traverse the grease storing cylinder 1 either towards the pipe 7 or towards the handle 18 according to the direction in which the hand is rotated. When the handle is rotated in the direction for moving the main plunger towards the pipe 7 this causes grease within the storing cylinder 1 in front of the main plunger to be forced forwardly so that grease passes into the secondary cylinder 14 of the outlet pipe 7.

Continued rotation of the handle of the grease gun in the last mentioned direction will cause grease to be discharged from the secondary cylinder 14 through the non-return valve 9, which will open under the pressure of the grease, and through and out of the pipe 7. This same operation can, of course, be effected by holding the handle 18 stationary and rotating the grease storing cylinder 1 about the guide rod 20 instead of vice versa.

Into the inner end of the guide rod 20 is screwed a tubular stud 31 having a frusto-conical head of slightly larger maximum diameter than the rod 20 so as to limit the extent to which the nut 22 may move upon the guide rod 20 towards the nozzle 8.

The secondary plunger 15 is in the form of a rod of circular cross section extending the full length of the grease storing cylinder 1 and for some distance beyond the cap 3 of the latter. The secondary plunger is a close sliding fit in the bore 32 of the stud 31 and in order that the secondary plunger may be a tight sliding fit in the secondary cylinder without the aid of extraneous packing, the end portion is split as shown; alternatively, a packing may be used.

The secondary plunger is of a diameter sufficiently smaller than the internal diameter of the tubular guide rod 20 to enable a helical compression spring 33 to be housed in the space between the secondary plunger and the inner surface of the guide rod 20.

The spring 33 bears at one end upon a collar 34 fixed upon the secondary plunger 15 and at the other end upon a washer 35 through which the plunger passes and which also retains packing washers 36 against the inner end of the stud 31. Thus the normal tendency of the spring 33 (which is always in slight compression) is to push the secondary plunger 15 away from its co-operating secondary cylinder 14. In its fully retracted position (as shown in Figure 1 of the drawing) the secondary plunger 15 is, at its front end, well clear of the cylinder 14 so as not to impede the passage of grease from the front of the grease storing cylinder 1 to the secondary cylinder 14.

The rear part 37 of the plunger 15 projects well into the hollow handle 18 of the grease gun and at its rear end has a semi-spherical recess 38 in which is mounted a steel ball 39 engaging in a cam groove 40 of approximately semi-circular cross section and formed in an arm 41 of a double ended lever 42, the other arm of which forms a trigger lever 43. The arm 41 of the lever 42 is housed within the hollow handle 18 of the grease gun, whilst the arm 43 projects from this hollow handle in a manner very similar to the trigger of a pistol so that a person holding the handle 18 in one hand can with the same hand readily operate the trigger lever 43 to pull this towards the handle and so move the lever arm 41 towards the grease storing cylinder 1, which results in the ball 39 rolling down the cam channel 40 and in the plunger 15 being moved forwardly towards the nozzle of the grease gun, whereby the front end of the plunger enters the cylinder 14 (in which the front end of the plunger is a close fit) causing grease in this secondary cylinder forcibly to be ejected therefrom via the non-return valve 9 and the nozzle 8 of the grease gun. On the trigger lever 43 being released the secondary plunger 15 is returned to its normal position (shown in Figure 1) by means of the spring 33.

The double ended lever 42 is pivoted to the handle 18 upon a transverse pin 44 carried by the handle.

The packing washers 36 arranged within the tubular guide rod 20 prevent grease which may possibly pass through the tubular stud 31 finding its way through the tubular guide rod 20 into the hollow handle 18; a packing washer 45 may also be provided as shown between the cap 2 and the co-operating end of the grease storing cylinder.

It will thus be seen that the grease gun in many respects resembles in appearance a pistol and that grease can be ejected from the gun by either rotating the handle 18 relative to the grease storing cylinder 1, or by rotating the latter whilst holding the handle 18 stationary, or by actuating the trigger lever 43. If it is convenient to both rotate the grease storing cylinder and to operate the trigger lever simultaneously this may be done as it speeds up the greasing operation. The ejection of grease by means of the trigger lever alone is found to be particularly convenient in awkward positions where one handed operation of the grease gun is desirable and to effect the relative screwing of the handle 18 and the grease storing cylinder 1 is not possible. Furthermore, considerable pressure in the ejection of the grease can be obtained by means of the trigger 43 and the associated mechanism and the grease can be forced into grease nipples and the like where without this mechanism considerable difficulty would be experienced in getting the grease home to the required position.

What I claim is:

1. A grease gun comprising a grease storing cylinder, a main plunger within the said storing cylinder, screw and nut means for traversing such main plunger along the said storing cylinder, a handle rotatable relative to the grease storing cylinder and controlling the said screw and nut means, a secondary cylinder in communication with the said storing cylinder, a secondary plunger co-operating with this secondary cylinder to eject grease therefrom, and a lever pivoted directly to said handle for actuating the said secondary plunger.

2. A grease gun comprising a grease storing cylinder, an externally screw threaded tubular guide rod mounted rotatably within and co-axial with said cylinder, a nut mounted on said guide rod and carrying a main plunger adapted to be traversed within said cylinder when the guide rod and cylinder are relatively rotated, a handle rigidly connected to the said guide rod, a secondary cylinder in communication with the said grease storing cylinder, a secondary plunger co-operating with said secondary cylinder to eject grease therefrom and mounted for axial sliding movement in the said tubular guide rod, and a lever pivoted directly to the said handle for operating the said secondary plunger.

3. A grease gun comprising a grease storing cylinder, an externally screw threaded tubular guide rod rotatable within and co-axial with said cylinder, a main plunger screwed on to said guide rod and adapted to be traversed within said cylinder when the guide rod and cylinder are relatively rotated, a handle rigidly connected to the said guide rod and disposed at one end of said cylinder, an outlet pipe embodying a secondary cylinder and a discharge nozzle and disposed at the opposite end of the said grease storing cylinder to said handle, a secondary plunger co-axial and co-operating with said secondary cylinder to eject grease therefrom and mounted for axial sliding movement in the said tubular guide rod, and a lever pivoted directly to the said handle for actuating the said secondary plunger.

4. A grease gun comprising a grease storing cylinder having a closure cap at each end, an externally screw threaded tubular guide rod mounted co-axially within the said storing cylinder and rotatably but not axially slidably carried by one of the said closure caps, a hollow handle rigidly connected to the said tubular guide rod so as to be rotatable therewith, a main plunger screwed on to said guide rod and adapted to be traversed within said cylinder when the guide rod and cylinder are relatively rotated, key and keyway means adapted to prevent relative rotation between the said main plunger and the grease storing cylinder, an outlet pipe carried co-axially by the other closure cap of the grease storing cylinder and embodying a secondary cylinder and a discharge nozzle, a secondary plunger co-axial and co-operating with the said secondary cylinder to eject grease therefrom and mounted for axial sliding movement through the said tubular guide rod, spring means urging the said plunger to a retracted position, and lever means arranged within the said hollow handle adapted on operation to move the said secondary plunger into the said secondary cylinder for ejecting grease therefrom.

5. A grease gun according to claim 4 wherein the said handle is of pistol handle type and the said lever is of a double ended type, one of the arms extending outside said hollow handle and serving to form a trigger to be grasped with said handle by which the lever may be operated for actuating the secondary plunger.

6. A grease gun comprising a main grease storing cylinder, a secondary cylinder communicating with the main cylinder, a main plunger within the main cylinder, screw and nut means for traversing the said main plunger along the main cylinder, an operating handle rotatable relatively to, and arranged outside, the main cylinder and controlling said screw and nut means, a secondary and reciprocable plunger within the main cylinder and adapted to cooperate at one end with the said secondary cylinder, and an operating member for said secondary plunger, such operating member being mounted upon the said operating handle so as to rotate therewith, and such operating member being movable relatively to the said handle for effecting the sliding movement of the said secondary plunger.

7. A grease gun having a pair of communicating cylinders, and independently operable pistons therein, relatively rotatable threaded means for effecting traverse of one of said pistons, said other piston being axially slidable in its cylinder, actuating means for both of said pistons operable simultaneously by one hand comprising a handle connected to said threaded means for relatively rotating the same, an actuator carried by, rotatable with, and relatively movable to said handle, and means connecting said actuator and said other piston.

8. A grease gun having a pair of communicating cylinders, and independently operable pistons therein, relatively rotatable threaded means for effecting traverse of one of said pistons, said other piston being axially slidable in its cylinder, actuating means for both of said pistons operable simultaneously by one hand comprising a handle connected to said threaded means for relatively rotating the same, an actuating lever pivoted to and rotatable with said handle, and means connecting said actuator and said other piston.

9. A grease gun comprising a casing having a pair of communicating cylinders therein, a piston cooperable with each of said cylinders, relatively rotatable threaded means for effecting traverse of one of said pistons, said other piston being axially slidable in its cylinder, a hollow handle rotatable about the axis of said casing and connected to said threaded means for effecting relative rotation thereof, to traverse said one piston, said other piston having a portion extending within said hollow handle, a lever pivoted to said handle and having one end extending into said hollow handle and engageable with said portion of said other piston, the other end of said lever extending outside said handle and forming a trigger.

10. A grease gun comprising a casing having a pair of communicating cylinders therein, a piston cooperable with each of said cylinders, relatively rotatable threaded means for effecting traverse of one of said pistons, said other piston being axially slidable in its cylinder, a hollow handle rotatable about the axis of said casing and connected to said threaded means for effecting relative rotation thereof to traverse said one piston, said other piston having a portion extending within said hollow handle, a lever pivoted to said handle, one end of said lever being received within said hollow handle and engageable with said portion of said other piston, and means exterior of said handle and carried thereby for actuating said lever.

11. A grease gun comprising a casing having a pair of communicating cylinders therein, a piston cooperable with each of said cylinders, relatively rotatable threaded means for effecting traverse of one of said pistons, said other piston being axially slidable in its cylinder, a hollow handle rotatable about the axis of said casing and connected to said threaded means for effecting relative rotation thereof to traverse said one piston, said other piston having a portion extending within said hollow handle, actuating means carried by said hollow handle and including a first part received within said hollow handle and engageable with said portion of the other piston and a second part for actuating said first part located outside said hollow handle, movable relative thereto, and adapted to be gripped together with said hollow handle by one hand of the operator.

CHAIM JAKOB NEUMAN.